(12) United States Patent
Tentorio et al.

(10) Patent No.: US 11,280,493 B2
(45) Date of Patent: Mar. 22, 2022

(54) FUEL SPRAY NOZZLE FOR GAS TURBINE ENGINE

(71) Applicants: ROLLS-ROYCE plc, London (GB); ROLLS-ROYCE DEUTSCHLAND LTD & CO KG, Dahlewitz (DE)

(72) Inventors: Luca Tentorio, Derby (GB); Juan Carlos Roman Casado, Derby (GB); Giacomo Di Chiaro, Derby (GB); Jonathan Knapton, Derby (GB); Filippo Zambon, Derby (GB); Radu Irimia, Derby (GB); Imon-Kalyan Bagchi, Derby (GB); James Robins, Derby (GB); Tomasz Stankowski, Derby (GB)

(73) Assignees: ROLLS-ROYCE plc, London (GB); ROLLS-ROYCE DEUTSCHLAND LTD & CO KG, Dahlewitz (DE)

( * ) Notice: Subject to any disclaimer, the term of this patent is extended or adjusted under 35 U.S.C. 154(b) by 100 days.

(21) Appl. No.: 16/689,300

(22) Filed: Nov. 20, 2019

(65) Prior Publication Data

US 2020/0191394 A1   Jun. 18, 2020

(30) Foreign Application Priority Data

Dec. 12, 2018   (GB) .................................... 1820206

(51) Int. Cl.
*F23R 3/14* (2006.01)
*F23R 3/28* (2006.01)
(Continued)

(52) U.S. Cl.
CPC ................ *F23R 3/14* (2013.01); *F23R 3/286* (2013.01); *F23R 3/30* (2013.01); *F23D 11/107* (2013.01);
(Continued)

(58) Field of Classification Search
CPC .... F23R 3/14; F23R 3/286; F23R 3/30; F23R 3/32; F23R 3/343; F23R 3/346; F23D 11/107; F23D 11/383; F23D 2900/11101
See application file for complete search history.

(56) References Cited

U.S. PATENT DOCUMENTS

| | | | | |
|---|---|---|---|---|
| 5,918,467 A | * | 7/1999 | Kwan | F23R 3/50 60/754 |
| 5,956,955 A | * | 9/1999 | Schmid | F23R 3/10 60/748 |

(Continued)

FOREIGN PATENT DOCUMENTS

| | | |
|---|---|---|
| CN | 104456628 A | 3/2015 |
| EP | 1391653 A2 | 2/2004 |

(Continued)

OTHER PUBLICATIONS

Jun. 11, 2019 Search Report issued in European Patent Application No. 1820206.9.

(Continued)

*Primary Examiner* — William H Rodriguez
(74) *Attorney, Agent, or Firm* — Oliff PLC (57) ABSTRACT

A fuel spray nozzle including a primary atomizer to discharge a flow of swirled atomised fuel along and around a fuel spray nozzle axis. The primary atomiser includes outer air swirler disposed radially outwardly of a fuel pre-filmer channel. A secondary atomiser disposed around the primary atomiser includes secondary inner air swirler to swirl flow along an inner air channel. The secondary inner air swirler disposed radially inwardly of a secondary fuel pre-filmer channel of the secondary atomiser. A primary outer air channel defined between the primary outer swirler and the secondary inner swirler. The secondary inner air swirler include splitter wall to separate swirling flow in the secondary inner channel from the primary flow of atomised fuel.

(Continued)

The secondary inner air swirler includes primary cap wall integral with and extending radially inwardly from the splitter wall to direct flow from the primary outer channel inwardly towards the fuel spray.

13 Claims, 5 Drawing Sheets

(51) Int. Cl.
  *F23R 3/30* (2006.01)
  *F23D 11/10* (2006.01)
  *F23D 11/38* (2006.01)
  *F23R 3/34* (2006.01)
(52) U.S. Cl.
  CPC ... *F23D 11/383* (2013.01); *F23D 2900/11101* (2013.01); *F23R 3/343* (2013.01); *F23R 3/346* (2013.01)

(56) References Cited

U.S. PATENT DOCUMENTS

| | | | |
|---|---|---|---|
| 6,272,840 B1* | 8/2001 | Crocker | F23D 11/107 60/776 |
| 8,365,531 B2* | 2/2013 | Pidcock | F23D 11/107 60/737 |
| 9,915,429 B2* | 3/2018 | Toon | F23R 3/28 |
| 2005/0039456 A1* | 2/2005 | Hayashi | F23D 11/107 60/737 |
| 2006/0272335 A1* | 12/2006 | Schumacher | F23R 3/12 60/804 |
| 2007/0028619 A1* | 2/2007 | Spooner | F23D 11/386 60/737 |
| 2007/0289306 A1* | 12/2007 | Suria | F23R 3/14 60/748 |
| 2008/0236165 A1 | 10/2008 | Baudoin et al. | |
| 2008/0302105 A1* | 12/2008 | Oda | F23R 3/343 60/737 |
| 2009/0100837 A1 | 4/2009 | Von Der Bank | |
| 2009/0173076 A1* | 7/2009 | Toon | F23D 14/74 60/746 |
| 2009/0255263 A1* | 10/2009 | Doerr | F23R 3/28 60/746 |
| 2010/0011772 A1 | 1/2010 | Gashi et al. | |
| 2010/0263382 A1* | 10/2010 | Mancini | F23R 3/28 60/742 |
| 2011/0016868 A1 | 1/2011 | Oda et al. | |
| 2011/0271680 A1* | 11/2011 | Bagchi | F23R 3/28 60/737 |
| 2011/0271681 A1* | 11/2011 | Bagchi | F23R 3/14 60/737 |
| 2012/0047903 A1 | 3/2012 | Williams et al. | |
| 2012/0305673 A1* | 12/2012 | Matsuyama | F23R 3/343 239/533.2 |
| 2014/0360202 A1* | 12/2014 | Toon | F23R 3/343 60/776 |
| 2015/0089920 A1* | 4/2015 | Ford | F23R 3/14 60/39.48 |
| 2015/0159874 A1 | 6/2015 | Toon et al. | |
| 2015/0323184 A1* | 11/2015 | Tangirala | F23R 3/12 60/746 |
| 2017/0299183 A1 | 10/2017 | Bagchi et al. | |
| 2019/0078784 A1* | 3/2019 | Tentorio | F23D 11/383 |
| 2019/0170354 A1* | 6/2019 | Resvanis | F23R 3/14 |
| 2019/0234615 A1* | 8/2019 | Stevens | F23R 3/26 |
| 2020/0025386 A1* | 1/2020 | Muldal | F02K 9/50 |
| 2020/0109854 A1* | 4/2020 | Lewis | F23R 3/002 |
| 2020/0408407 A1* | 12/2020 | Tentorio | F23R 3/283 |
| 2020/0408408 A1* | 12/2020 | Tentorio | F23R 3/343 |

FOREIGN PATENT DOCUMENTS

| | | |
|---|---|---|
| EP | 1413830 A2 | 4/2004 |
| EP | 1719950 A2 | 11/2006 |
| EP | 3537048 A1 | 9/2019 |
| WO | 2008/071902 A1 | 6/2008 |

OTHER PUBLICATIONS

Mar. 13, 2020 Search Report issued in European Patent Application No. 19208446.

Feb. 8, 2021 Office Action issued in European Patent Application No. 19208446.5.

\* cited by examiner

FUEL SPRAY NOZZLE FOR GAS TURBINE ENGINE

CROSS-REFERENCE TO RELATED APPLICATIONS

This specification is based upon and claims the benefit of priority from United Kingdom patent application number GB 1820206.9 filed on Dec. 12, 2018, the entire contents of which are incorporated herein by reference.

BACKGROUND

Field of the Disclosure

The present disclosure relates to a fuel spray nozzle for a combustor in a gas turbine engine.

Description of the Related Art

Fuel spray nozzles are a type of injector used in gas turbine engines to provide fuel to combustors for combustion. The fuel spray nozzle atomises fuel and ejects the atomised fuel into the combustor for more effective combustion.

SUMMARY OF THE DISCLOSURE

According to an aspect, there is provided a fuel spray nozzle for a combustor in a gas turbine engine, the fuel spray nozzle comprising: a primary atomiser configured to discharge a primary flow of swirled atomised fuel along and around a fuel spray nozzle axis, the primary atomiser comprising a primary outer air swirler disposed radially outwardly of a primary fuel pre-filmer channel; a secondary atomiser around the primary atomiser comprising a secondary inner air swirler configured to swirl flow along a secondary inner air channel, the secondary inner air swirler being disposed radially inwardly of a secondary fuel pre-filmer channel of the secondary atomiser. A primary outer air channel is defined between the primary outer air swirler and the secondary inner air swirler. The secondary inner air swirler comprises a splitter wall configured to separate swirling flow in the secondary inner air channel from the primary flow of atomised fuel; and wherein the secondary inner air swirler comprises a primary cap wall integral with and extending radially inwardly from the splitter wall to direct flow from the primary outer air channel inwardly towards the fuel spray nozzle axis.

The splitter wall may comprise a conical portion extending with a radially outward component along a downstream direction along the fuel spray nozzle axis.

The primary cap wall may comprise a conical wall configured to direct flow from the primary outer air channel towards the fuel spray nozzle axis, and a radially-extending wall between the splitter wall and the conical wall.

The primary cap wall may comprises splitter cooling holes configured to admit air from the outer primary air channel to form a cooling film along the splitter wall. The splitter cooling holes may be provided in a portion of the primary cap wall between the radially-extending wall and the splitter wall. The splitter cooling holes may be provided at a junction between the primary cap wall and the splitter wall. The splitter cooling holes may be configured to impart a radially outward component to an air flow therethrough to direct cooling air towards the splitter wall. The splitter cooling holes may be configured to impart a tangential component to an air flow therethrough to direct the cooling air towards the splitter wall.

The conical wall of the primary cap wall may comprise cooling holes for cooling the primary cap wall.

The splitter wall may comprise an array of effusion cooling holes

There may be no separate component in the space defined between the primary outer air swirler and the secondary inner air swirler.

The primary atomiser may comprise an inner primary swirler disposed radially inwardly of the primary fuel pre-filmer channel. The inner primary swirler may be configured to swirl a flow of air along the fuel spray nozzle axis.

The secondary atomiser may comprise an outer secondary swirler radially outwardly of a secondary fuel pre-filmer channel. The outer secondary swirler may be configured to swirl a flow of air into the path of flow from the secondary inner air swirler.

According to a second aspect, there is provided a combustor comprising a fuel spray nozzle in accordance with the first aspect.

According to a third aspect, there is provided a gas turbine engine comprising a combustor in accordance with the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox is a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. A higher gear ratio may be more suited to "planetary" style gearbox. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity Utip. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and Utip is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$. The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5, or 20. The bypass ratio may be in an inclusive range bounded by any two of the values in the previous sentence (i.e. the values may form upper or lower bounds). The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg−1 s, 105 Nkg−1 s, 100 Nkg−1 s, 95 Nkg−2 s, 90 Nkg−1 s, 85 Nkg−1 s or 80 Nkg−1 s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades may be formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding. The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments of the invention will now be described, by way of example only, with reference to the accompanying drawings, in which.

DETAILED DESCRIPTION OF THE DISCLOSURE

Aspects and embodiments of the present disclosure will now be discussed with reference to the corresponding drawings. Other aspects and embodiments will be apparent to those skilled in the art.

Figure 1:
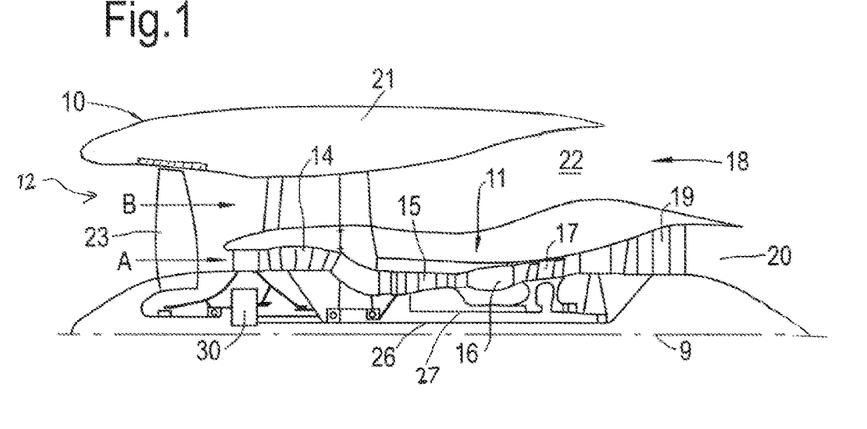
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
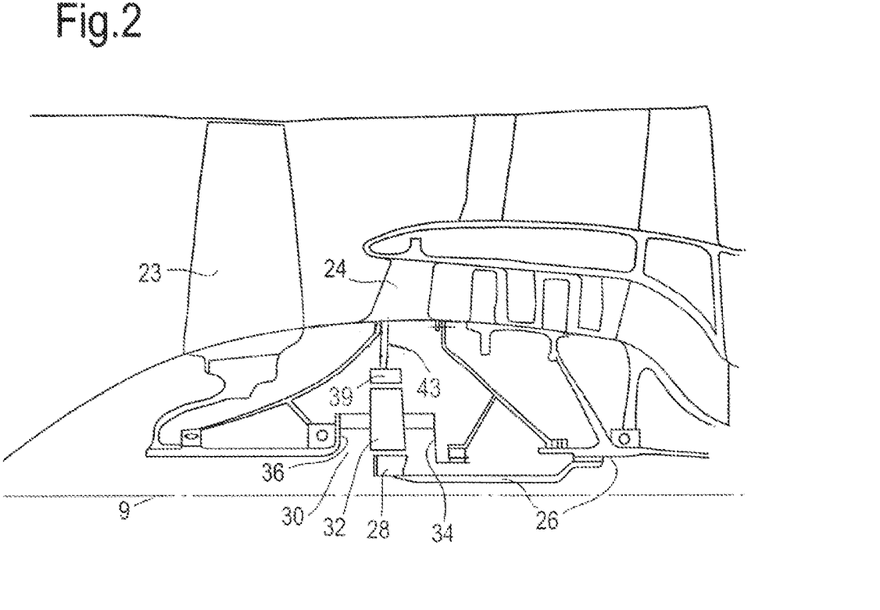
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 39 that is coupled, via linkages 43, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
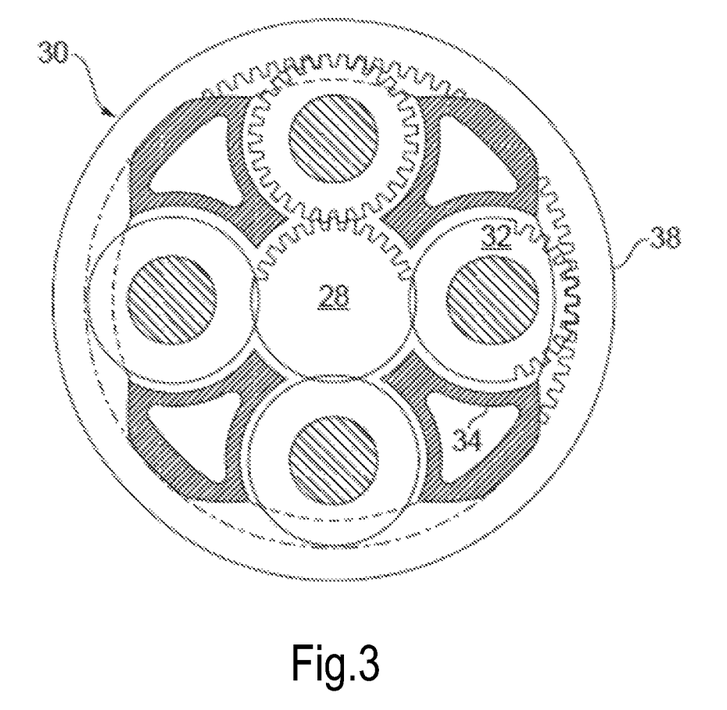
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 39 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 39 fixed. However, any other suitable type of epicyclic gearbox 30 may be used. By way of further example, the epicyclic gearbox 30 may be a star arrangement, in which the planet carrier 34 is held fixed, with the ring (or annulus) gear 39 allowed to rotate. In such an arrangement the fan 23 is driven by the ring gear 39. By way of further alternative example, the gearbox 30 may be a differential gearbox in which the ring gear 39 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 43 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
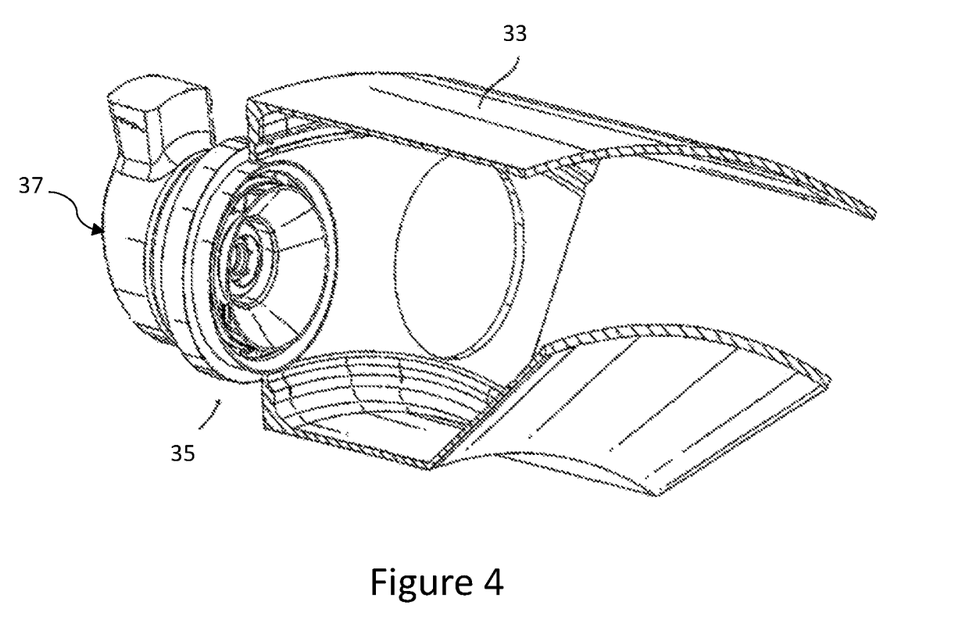
FIG. 4 schematically shows a cutaway view of a combustor with a fuel spray nozzle.

FIG. 4 shows a cutaway view of an annular combustor 33 of a gas turbine engine 10 defining a combustion chamber having an inlet 35 at an upstream end for receiving a fuel spray nozzle 37. The fuel spray nozzle 37 is configured to receive fuel and to atomise the fuel so as to eject atomised fuel into the combustor 33 for combustion.

Figure 5:
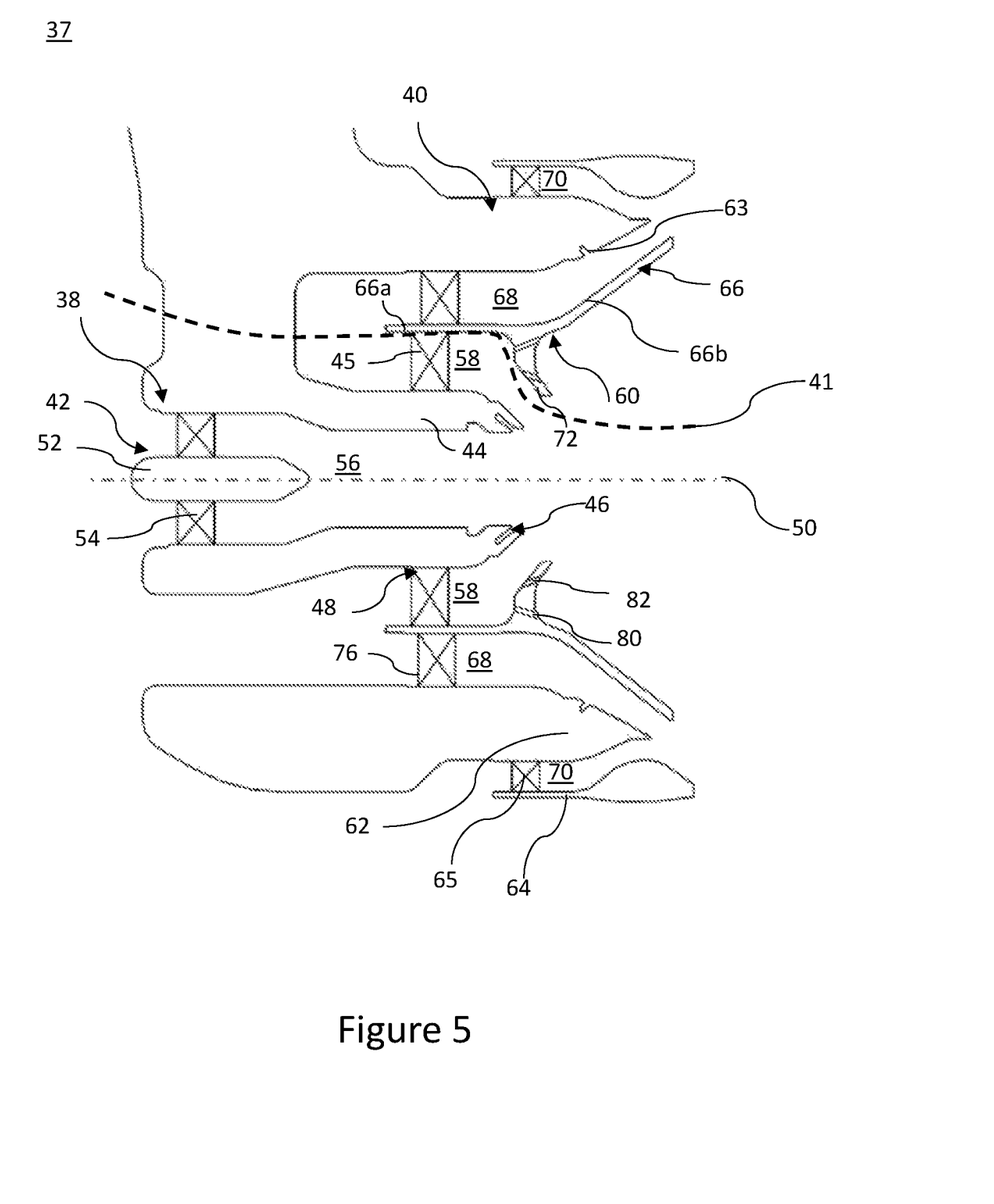
FIG. 5 shows a cross sectional view of a fuel spray nozzle.

FIG. 5 shows a cross-sectional side view of the fuel spray nozzle 37. The fuel spray nozzle has a generally circular profile from a front view. The fuel spray nozzle 37 comprises a primary atomiser 38 and a secondary atomiser 40. The primary atomiser is a central or pilot swirler, and the secondary atomiser is disposed radially outside of the primary swirler to surround it. The secondary atomiser may be referred to as a peripheral atomiser in that it surrounds the primary atomiser. The primary atomiser 38 is configured to receive fuel, to receive an air flow at an upstream end, and to discharge a primary flow of atomised fuel into the combustion chamber. The secondary atomiser 40 is disposed circumferentially around the primary atomiser 38 and is configured to receive fuel, air flow at an upstream end, and to discharge a secondary flow of atomised fuel into the combustion chamber.

The primary and secondary atomisers may be provided as a common assembly, and may be wholly or partially integral with one another. The functional division between them will become clear from the following description. However, for clarity, a nominal dividing line 41 between the components of the primary and secondary atomisers 38, 40 is shown in FIG. 5. The dividing line 41 is shown only on one side of the fuel spray nozzle cross-section to show features of the fuel spray nozzle more clearly.

In use, only the primary atomiser 38 receives fuel in low flow conditions, and the secondary atomiser 40 receives fuel together with the primary atomiser 38 in high flow conditions.

The primary atomiser 38 comprises a primary inner air swirler 42, a primary fuel pre-filmer 44 and a primary outer air swirler 48. The primary inner air swirler 42 is disposed radially inwardly from the primary fuel pre-filmer 44 and the primary outer air swirler 48 is disposed radially outwardly from the primary fuel pre-filmer 44.

A primary inner air channel 56 is defined radially within (i.e. inwardly of) the primary fuel pre-filmer 44. The inner air swirler 42 is disposed within the primary inner air channel 56 and in this example comprises a central post 52 (otherwise known as a "bullet") having a plurality of vanes 54 distributed around the central post 52 and configured to impart a tangential velocity component to generate a swirling flow (e.g. helical). The central post 52 is aligned with a fuel spray nozzle axis 50 and the vanes 54 swirl air flowing through the primary inner air channel 56 (i.e. rotate or twist by imparting a circumferential/tangential component to the flow).

The primary fuel pre-filmer 44 defines an annular primary fuel pre-filmer channel 46. The primary fuel pre-filmer channel 46 is configured to receive pressurised fuel from a fuel source (not shown) and to eject an annular film of fuel from an outlet downstream of the primary inner air swirler 42.

The secondary atomiser 40 comprises a secondary inner air swirler 60, a secondary fuel pre-filmer 62 disposed radially outwardly from the secondary inner air swirler 60, and a secondary outer air swirler 64 disposed radially outwardly of the secondary fuel pre-filmer 62.

A primary outer air channel 58 is defined between the primary outer air swirler 48 and the secondary inner air swirler 60. The primary outer air swirler 48 comprises a plurality of vanes 45 distributed around a support provided by the primary fuel pre-filmer 44 which are configured to swirl air flowing through the primary outer air channel 58.

A secondary inner air channel 68 is defined between the secondary inner air swirler 60 and the secondary fuel pre-filmer 62. A secondary outer air channel 70 is defined between the secondary fuel pre-filmer 62 and the secondary outer air swirler 64.

The secondary fuel pre-filmer 62 defines an annular secondary fuel pre-filmer channel 63. The annular secondary fuel pre-filmer channel 63 is configured to receive pressurised fuel from a fuel source (not shown) and to eject an annular film of fuel from an outlet by the secondary inner air channel 68.

The secondary outer air swirler 64 comprises a peripheral support and a plurality of vanes 65 distributed around and radially inwardly from the peripheral support for swirling air flow through the secondary outer air channel 70. The secondary outer air swirler 64 is configured so that the secondary outer air channel 70 is generally conical and extends with a radially inward component in a downstream direction along the fuel spray nozzle axis 50.

The secondary inner air swirler 60 comprises a splitter wall 66 having an upstream annular portion 66a, and a downstream conical portion 66b extending with a radially outward component from the annular portion 66a in a downstream direction along the fuel spray nozzle axis 50. The upstream annular portion 66a of the splitter wall 66 comprises a plurality of vanes 76 distributed around an outer surface of the annular portion 66a of the splitter wall 66 to swirl air flowing through the secondary inner air channel 68.

The annular portion 66a is configured to separate the swirling flow in the secondary inner air channel 68 from the swirling flow in the primary outer air channel 58. The conical portion 66b of the splitter wall 66 is configured to separate the swirling flow in the secondary inner air channel 68 from the primary flow of atomised fuel downstream of the primary atomiser 38—i.e. the flow from the primary atomiser as it enters the combustion chamber. The downstream conical portion 66b is also configured to direct the air flow in the secondary inner air channel 68 radially outwardly in a downstream direction along the fuel spray nozzle axis 50, due to its conical profile.

The secondary outer air channel 70 and the secondary inner air channel 68 are configured so that their respective air flows collide (shown in FIG. 5). Between the secondary inner channel 68 and the secondary outer channel 70, the secondary fuel pre-filmer 62 ejects the film of fuel which collides with these air flows. These colliding swirled flows atomise the fuel in the fuel film, so that the secondary atomiser 40 ejects a secondary flow of atomised fuel into the combustion chamber.

The secondary inner air swirler 60 further comprises a primary cap wall 72 which is disposed downstream of the outlet of the primary fuel pre-filmer 44. The primary cap wall 72 is integral with the splitter wall 66 and comprises a conical wall portion extending with a radially inward component in a downstream direction along the fuel spray nozzle axis 50 to direct flow from the primary outer air channel 58 radially inwardly towards the fuel spray nozzle axis 50. In this particular example, the primary cap wall 72 comprises a substantially radially-extending wall portion between the conical wall portion and the splitter wall 66, in particular extending from a junction between the annular portion 66a and the conical portion 66b of the splitter wall 66.

The primary cap wall 72 is configured to direct swirled flow in the primary outer air channel 58 radially inwardly in a downstream direction so as to direct the flow into the path of the film of fuel from the primary fuel pre-filmer 44 and into the swirling flow from the primary inner air channel 56. The collision of these flows results in atomisation of the fuel so that the primary atomiser 38 discharges a primary flow of atomised fuel in a similar manner to the secondary atomiser 40.

The primary flow of atomised fuel is combusted in the combustion chamber in use, as well as the secondary flow of atomised fuel, such that the radially inner surface of the conical portion 66b of the splitter wall 66 may be exposed to high combustion temperatures, typically above a sustainable temperature for metal. The downstream surface of the primary cap wall 72 facing the combustion chamber may also exposed to these high temperatures.

These surfaces of the splitter 66 and the primary cap wall 72 may be cooled during use to temperatures lower than the temperature of combustion in the combustor, to thereby minimise damage sustained by these components and extend their useful life.

In this example, the primary cap wall 72 comprises a plurality of splitter cooling holes 80 distributed circumferentially around the secondary inner air swirler 60 and configured to admit allow air flow from the primary outer air channel 58 through the primary cap wall 72 to form a cooling film along the radially inner surface of the splitter wall 66. The splitter cooling holes 80 are provided in a portion of the primary cap wall 72 between the primary cap wall 72 and the splitter wall 66. In this example, the splitter cooling holes 80 are provided at a junction between the primary cap wall 72 and the splitter wall 66.

The splitter cooling holes 80 extend with a radially outward component in a downstream direction to impart a radially outward component to air flow through the splitter cooling holes 80. This helps to direct the cooling air along the surface of the conical portion 66b of the splitter wall 66. Further, the splitter cooling holes 80 extend with a tangential component in the primary cap wall 72 in order to also impart a tangential component to the air flow through the splitter cooling holes 80. This imparts a swirl to the air flow, and a centrifugal force, further helping to direct the cooling air towards the surface of the conical portion 66b of the splitter wall 66.

In this particular example, the conical wall of the primary cap wall 72 also comprises an array of cooling holes 82 (e.g. circumferentially distributed around the primary cap wall 72) for cooling the surface of the primary cap wall 72 which may be exposed to the combustion chamber with air from the primary outer air channel 58. In other examples, the primary cap wall may comprise more than one array of cooling holes at different radial locations which are circumferentially distributed around the primary cap wall.

In this example, there are no cooling holes provided on the substantially radially-extending wall portion of the primary cap wall 72. This is so that the primary cap wall 72 can be easily replaced on the secondary inner air swirler 60 of the fuel spray nozzle 37. The radially-extending wall provides a flat surface which can easily be cut to remove the conical wall of the primary cap wall 72 and which provides a suitable surface to provide a new conical wall to the secondary inner air swirler 60 (for example by welding or additive manufacture).

Figure 6:
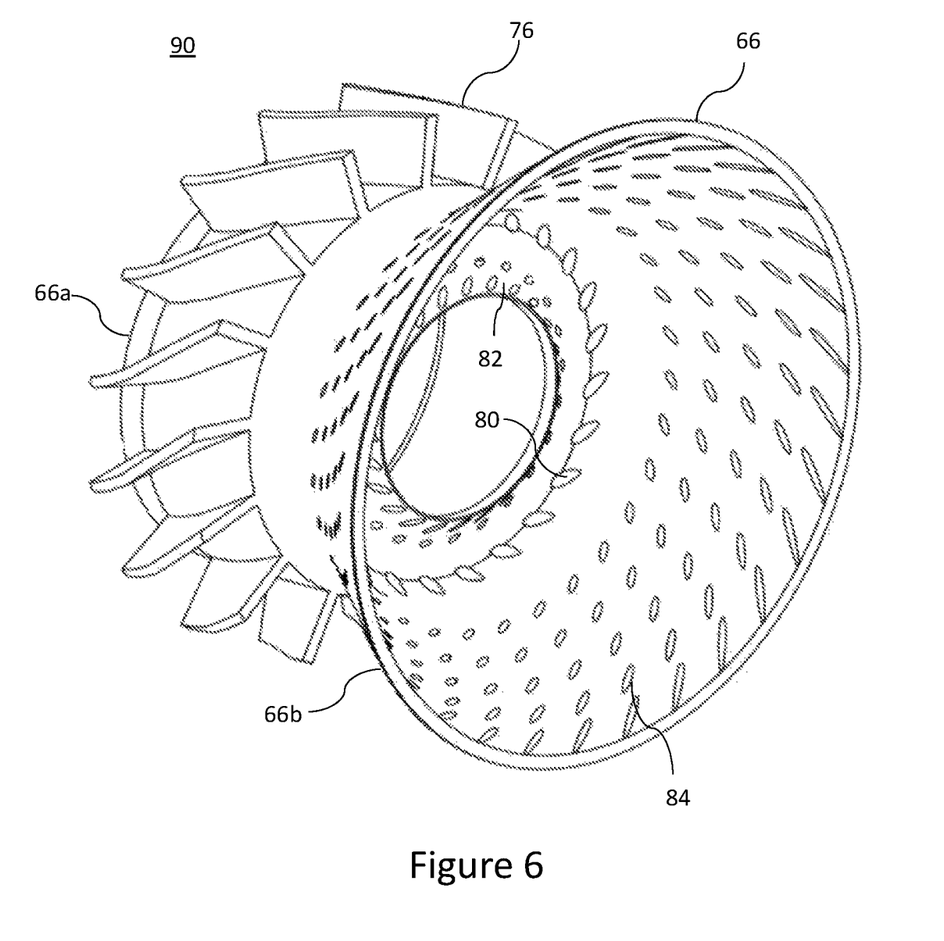
FIG. 6 shows an isometric view of a secondary inner air swirler.

A second example secondary inner air swirler 90 is shown in FIG. 6 isolated from a fuel spray nozzle in an isometric view. The second example secondary inner air swirler 90 has all of the same features as the first example secondary inner air swirler 60 as described above with reference to FIG. 5, including the splitter cooling holes 80 and the array of cooling holes 80 in the primary cap wall 72. However, in this example the conical portion 66b of the splitter wall 66 additionally comprises an array of effusion cooling holes 84 around the splitter wall 66. These effusion cooling holes 84 provide further cooling of the conical portion 66b of the splitter wall 66 in use, as the air flowing in the secondary inner air channel 68 passes through the effusion cooling holes 84 to cool the conical portion 66b of the splitter wall 66. In some examples, such as the previous example shown in FIG. 5, there may be no effusion cooling holes in the splitter wall. In yet further examples, there may be effusion cooling holes in the splitter wall, and no splitter cooling holes in the primary cap wall.

Although it has been described that the splitter wall comprises an upstream annular portion and a downstream conical portion, in some examples, the splitter wall may have an upstream and downstream annular portion. In some of such examples, the splitter cooling holes may not extend with a radially outward component.

The fuel spray nozzle 37 having a secondary inner air swirler as described above provides a compact solution for cooling the splitter wall. In previously considered arrangements, an additional component was provided between the primary outer air swirler and the secondary inner air swirler to direct the flows. With the arrangement of this invention, no such additional component is required. Therefore, manufacturing of the fuel spray nozzle is simpler such that manufacturing costs are reduced and the fuel spray nozzle can be made more compact. This may also result in a weight saving compared to previously considered arrangements.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A fuel spray nozzle for a combustor in a gas turbine engine, the fuel spray nozzle comprising:
   a primary atomiser configured to discharge a primary flow of swirled atomised fuel along and around a fuel spray nozzle axis, the primary atomiser comprising a primary outer air swirler disposed radially outwardly of a primary fuel pre-filmer channel; and
   a secondary atomiser around the primary atomiser comprising a secondary inner air swirler configured to swirl flow along a secondary inner air channel, the secondary inner air swirler being disposed radially inwardly of a secondary fuel pre-filmer channel of the secondary atomiser, wherein:
   a primary outer air channel is defined between the primary outer air swirler and the secondary inner air swirler;
   the secondary inner air swirler comprises a splitter wall configured to separate swirling flow in the secondary inner air channel from the primary flow of atomised fuel;
   the secondary inner air swirler comprises a primary cap wall integral with and extending radially inwardly from the splitter wall to direct flow from the primary outer air channel inwardly towards the fuel spray nozzle axis;
   the primary cap wall comprises (i) a conical wall configured to direct flow from the primary outer air channel towards the fuel spray nozzle axis and (ii) a radially-extending wall between the splitter wall and the conical wall; and
   the primary cap wall comprises splitter cooling holes configured to admit air from the primary outer air channel to form a cooling film along the splitter wall.

2. The fuel spray nozzle according to claim 1, wherein the splitter wall comprises a conical portion extending with a radially outward component along a downstream direction along the fuel spray nozzle axis.

3. The fuel spray nozzle according to claim 1, wherein the splitter cooling holes are provided in a portion of the primary cap wall between the radially-extending wall and the splitter wall.

4. The fuel spray nozzle according to claim 3, wherein the splitter cooling holes are configured to impart a radially outward component to an air flow therethrough to direct cooling air towards the splitter wall.

5. The fuel spray nozzle according to claim 3, wherein the splitter cooling holes are configured to impart a tangential component to an air flow therethrough to direct cooling air towards the splitter wall.

6. The fuel spray nozzle according to claim 1, wherein the conical wall of the primary cap wall comprises cooling holes for cooling the primary cap wall.

7. The fuel spray nozzle according to claim 1, wherein the splitter wall comprises an array of effusion cooling holes.

8. The fuel spray nozzle according to claim 1, wherein the primary atomiser comprises an inner primary swirler disposed radially inwardly of the primary fuel pre-filmer channel, the inner primary swirler configured to swirl a flow of air along the fuel spray nozzle axis.

9. The fuel spray nozzle according to claim 1, wherein the secondary atomiser comprises an outer secondary swirler radially outwardly of the secondary fuel pre-filmer channel, the outer secondary swirler configured to swirl a flow of air into the path of flow from the secondary inner air swirler.

10. A combustor comprising a fuel spray nozzle in accordance with claim 1.

11. A gas turbine engine comprising a combustor in accordance with claim 10.

12. The fuel spray nozzle according to claim 1, wherein:
   the splitter wall includes an annular portion upstream of the radially-extending wall of the primary cap wall; and
   the radially-extending wall extends radially inward from the annular portion.

13. A fuel spray nozzle for a combustor in a gas turbine engine, the fuel spray nozzle comprising:
   a primary atomiser configured to discharge a primary flow of swirled atomised fuel along and around a fuel spray nozzle axis, the primary atomiser comprising a primary outer air swirler disposed radially outwardly of a primary fuel pre-filmer channel; and
   a secondary atomiser around the primary atomiser comprising a secondary inner air swirler configured to swirl flow along a secondary inner air channel, the secondary inner air swirler being disposed radially inwardly of a secondary fuel pre-filmer channel of the secondary atomiser, wherein:
   a primary outer air channel is defined between the primary outer air swirler and the secondary inner air swirler;
   the secondary inner air swirler comprises a splitter wall configured to separate swirling flow in the secondary inner air channel from the primary flow of atomised fuel;
   the secondary inner air swirler comprises a primary cap wall integral with and extending radially inwardly from the splitter wall to direct flow from the primary outer air channel inwardly towards the fuel spray nozzle axis;
   the primary cap wall comprises (i) a conical wall configured to direct flow from the primary outer air channel towards the fuel spray nozzle axis and (ii) a radially-extending wall between the splitter wall and the conical wall; and
   the splitter wall comprises an array of effusion cooling holes.

* * * * *